United States Patent [19]
Kisielewski

[11] 3,911,772
[45] Oct. 14, 1975

[54] MOBILE MATERIAL CUTTER

[75] Inventor: Robert Kisielewski, Onalaska, Wis.

[73] Assignee: Cryogenic Recycling International Inc., LaCrosse, Wis.

[22] Filed: Feb. 6, 1974

[21] Appl. No.: 439,916

[52] U.S. Cl. .................. 83/278; 83/210; 83/513; 83/598; 83/923; 83/925 R; 83/928
[51] Int. Cl.² ........................................ B23D 17/06
[58] Field of Search .......... 83/925 R, 923, 513, 516, 83/517, 598, 370, 372, 210, 277, 423, 155, 928

[56] References Cited
UNITED STATES PATENTS

| | | | |
|---|---|---|---|
| 1,461,796 | 7/1923 | Frahm | 83/210 X |
| 1,629,233 | 5/1927 | Streine | 83/210 |
| 1,784,556 | 12/1930 | Townsend et al. | 83/210 X |
| 1,812,122 | 6/1931 | Streine | 83/210 |
| 3,477,327 | 11/1969 | Hizawa | 83/371 |
| 3,736,822 | 6/1973 | McVaugh | 83/923 X |

*Primary Examiner*—J. M. Meister
*Attorney, Agent, or Firm*—Gerald S. Geren

[57] ABSTRACT

A method for cryogenically treating automotive tires is disclosed which includes chopping substantially whole tires into segments so as to assure drainage of the cryogen from the tire after treatment. There is also disclosed a truck mounted apparatus for chopping the whole tires, or coiled materials, into segments. The apparatus is mounted to the bed of a truck and includes a delivery conveyor for moving the tire or coil to a pair of hydraulically-operated shears which are mounted on the bed for chopping the tire, or coil, into two segments. The delivery conveyor and shears are synchronized so that each tire or coil is delivered to the shear, the conveyor is stopped, the shears are activated, the tire or coil is chopped, the conveyor is restarted and the tire or coil segments are then discharged from the shear. The discharged segments drop onto a discharge conveyor which transports the segments to a station for secondary treatment.

2 Claims, 4 Drawing Figures

MOBILE MATERIAL CUTTER

BACKGROUND OF THE INVENTION

This invention relates to a method for cryogenically treating automotive tires and a mobile apparatus for chopping the tires, or coiled materials, into segments.

Scrap rubber tires present a substantial problem in that until recently there has been no economical or ecologically satisfactory method for disposing of the tire or for recovering or reclaiming the rubber therein. Recent developments have provided a method, for recovering or reclaiming the rubber, which includes submerging the tire in a bath of cryogenic liquid until it reaches an embrittling temperature, removing the tire from the bath, striking the tire so as to shatter it into fragments and thereafter reclaiming the rubber. It has been found that the tires tend to retain the cryogenic liquid in the interior thereof and that it is difficult to drain which results in a waste of cryogen as well as the time necessary to drain the tire.

It is therefore an object of this invention to provide a method and apparatus for cryogenically treating tires which includes a method of assuring complete drainage of the cryogenic liquid from the tire.

Rubber tires are usually dumped at local land fills and for that reason mobile apparatus for treating the tires at different land fill sites is desirable.

It is therefore another object of this invention to provide a mobile apparatus for treating the tires so as to assure substantially complete drainage of the cryogen.

Until recently coiled wire and plastic bleedings from injection molding machines have been treated as scrap and discarded. Recent developments have made it economically feasible to recover the metallic wire and plastic by cryogenic techniques. However to efficiently recover these materials from the coils, the coils must be cut into segments.

Therefore yet another object of this invention is to provide an apparatus for chopping coiled materials into segments.

These and other objects of this invention will become apparent from the following description and appended claims.

SUMMARY OF THE INVENTION

It has been found that substantially complete drainage of the tire can be assured by chopping the tire into segments, usually halves, before cryogenically treating the tire.

There is provided by virtue of this invention a mobile material chopping apparatus which can be moved from one land fill or storage site to another for chopping the tires or coiled materials. The apparatus is suitable for chopping most materials, which are in a ring or toroidal shape, into segments. The apparatus is mounted on a truck bed and includes chopping shears, a portable delivery conveyor which can be arranged to deliver substantially whole tires or coils to the shears, and a discharge conveyor for receiving the chopped segments and delivering them to a storage or treatment site. Both the delivery conveyor and discharge conveyor are removably mounted to the truck bed so that they can be moved from site-to-site with the truck and can be removed at the site for positioning in relation to the shears to deliver or receive the tires or coils as necessary. The apparatus also includes portable power generating means for supplying the power to operate the conveyors and the shears.

DESCRIPTION OF THE PREFERRED EMBODIMENT

Figure 1:
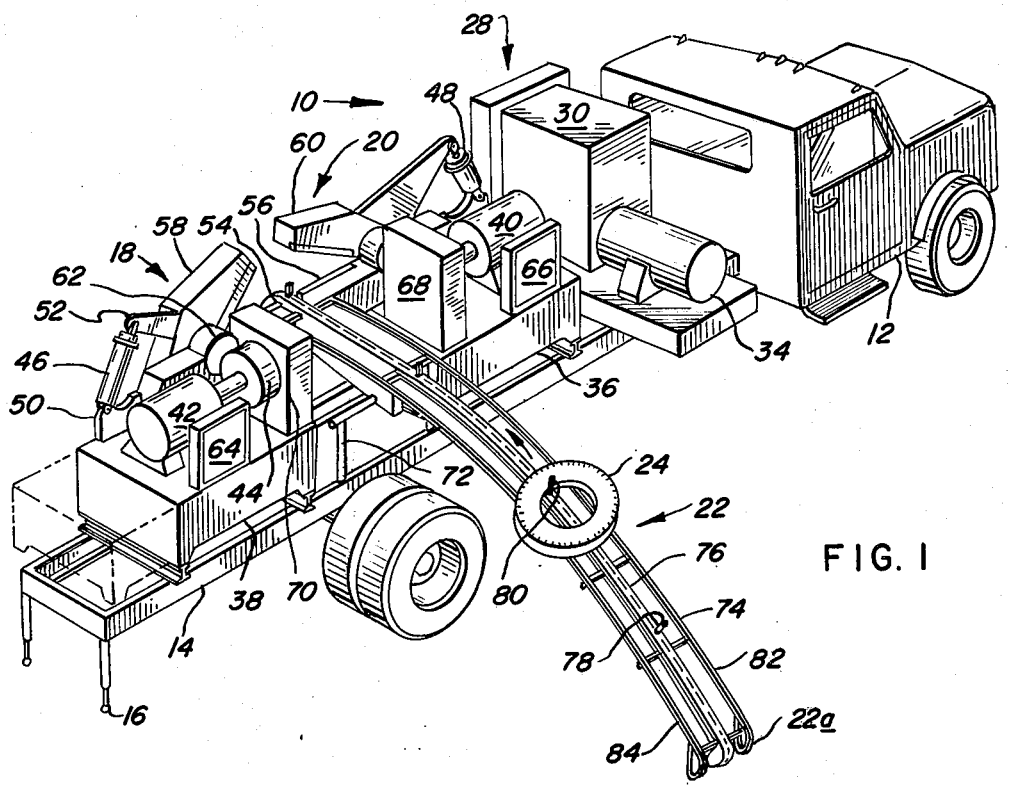
FIG. 1 is a perspective view of the apparatus showing a whole tire on the conveyor belt for delivery to the shears.
Figure 2:
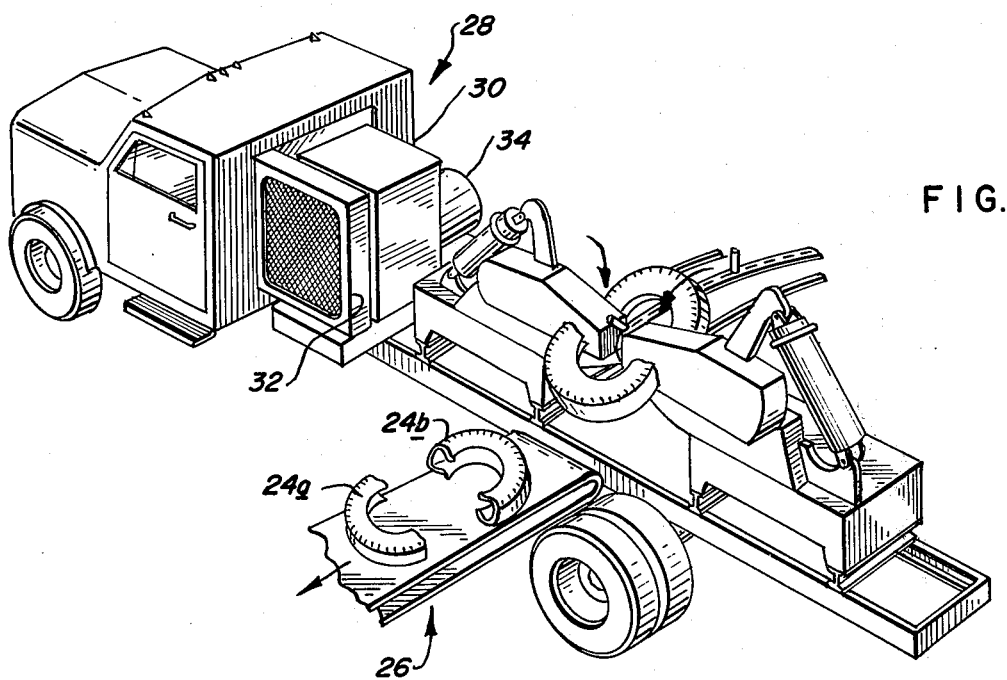
FIG. 2 is a perspective view of the apparatus showing a tire being chopped by the shears and segments of a tire on the discharge conveyor.
Figure 3:
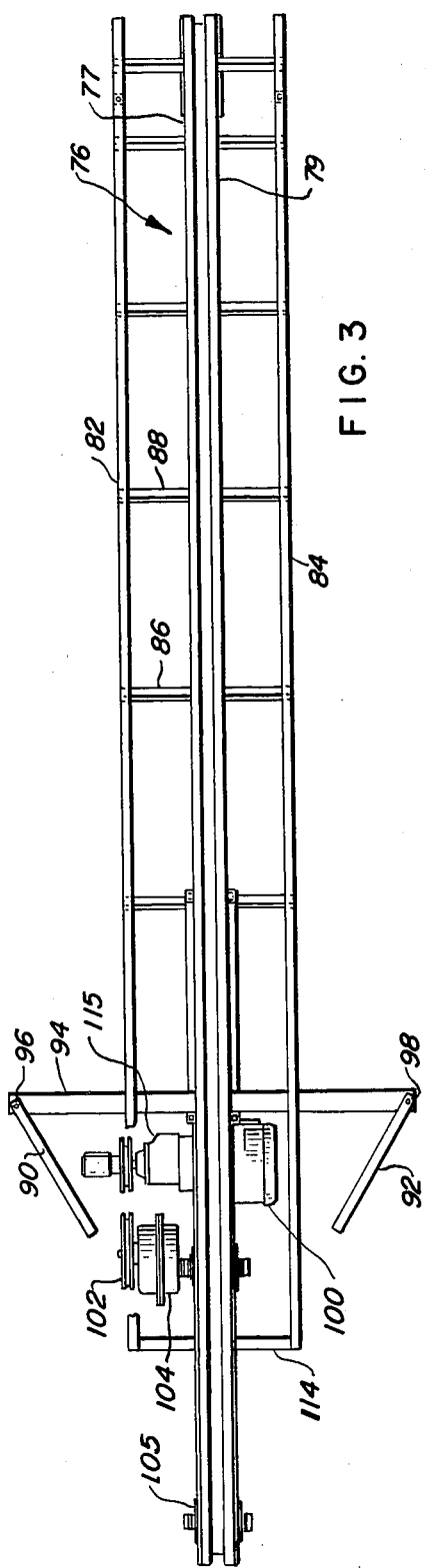
FIG. 3 is a plan view of the delivery conveyor.
Figure 4:
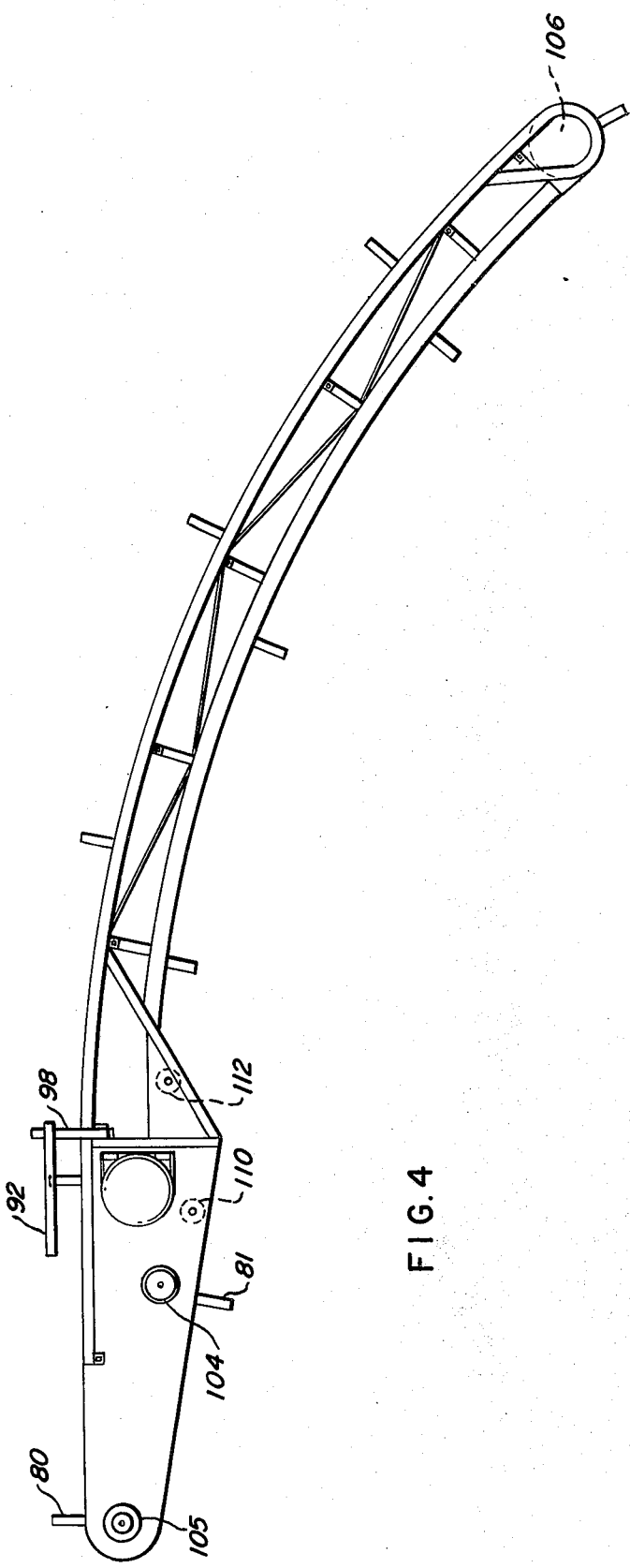
FIG. 4 is a side elevational view of the delivery conveyor.

Referring now to the drawings, there is shown a mobile-material-chopping apparatus 10, generally, which includes a truck having a cab 12 and a bed or frame 14 to which extensible stabilizing jacks, such as 16, are mounted.

The chopping apparatus includes a pair of hydraulic shears 18 and 20, generally, which are mounted to the truck bed 14, in a position to chop or cut tires or coiled materials which are moving across the frame in a generally transverse direction. A delivery conveyor 22, generally, is removably mounted to the bed at a generally transverse attitude for delivering tires such as 24, or coiled materials, from a position on the ground to a position for chopping by the shears 18 and 20. A discharge conveyor 26, generally, is positioned on the discharge side of the shears 18 and 20 for receiving the chopped segments, such as 24a and 24b, and for delivering them to a storage or treatment site. A motor generator set 28, generally, is mounted to the bed adjacent the cab for generating the power to operate the conveyors and hydraulic shears.

The motor generator set 28 includes a standard diesel engine (not shown) which is enclosed in the housing 30 and a radiator 32 for the engine. An electrical generator 34, generally, is provided at the output end of the diesel engine.

Each of the shears 18 and 20 includes a hydraulic reservoir such as 36 and 38 which is mounted on the bed 14 and provides the base upon which the shear is mounted. The shears include electric motors 40 and 42, which obtain their power from the generator 34, and each of the motors drive a hydraulic pump, such as 44, that is in fluid communication with the reservoirs, such as 36 and 38. The pumps, such as 44, deliver pressurized hydraulic fluid to the double-acting hydraulic cylinders 46 and 48, each of which are mounted at the cylinder end to an upstanding plate, such as 50, on the reservoir base. The piston or rod end of the cylinder is connected to a lever arm such as 52.

Each of the shears includes a stationary jaw member, such as 54 or 56, and a movable jaw member, such as 58 and 60. The upper or movable jaw, such as 58, is mounted to the stationary member by means of bearings enclosed within the housing 62. Each of the upper jaws is pivotally movable, in a substantially vertical plane which is parallel to the longitudinal axis of the bed, between an open position and closed position by means of the double-acting hydraulic cylinders 46 and 48. Appropriate control panels 64 and 66 are provided in association with each of the shears for controlling the operation of the shears. Heat exchangers 68 and 70 are provided for cooling the hydraulic fluid.

When the conveyor 22 is positioned for delivering the tires or coils to the shears, it is aligned in a direction substantially transverse to the longitudinal axis of the truck bed and transverse to the chopping or cutting action of the shears. The entry end 22a of the conveyor can be positioned at ground level and the other end of the conveyor is positioned between the two shears 18 and 20. The conveyor is mounted to the bed 14 by means of shock absorbers, such as 72, which permit the conveyor to flex and move as the shears chop the tires.

The conveyor includes a tubular metal frame 74 which supports a continuous conveyor chain 76 that is guided between spaced longitudinal guide members 77 and 79. The chain has mounted thereto post-like flight members, such as 78 and 80, projecting at right angles thereto for engaging the inside edges of the tire or coil. These posts provide the flights to move the tire or coil to the shears and as the tire or coil is moved by the flights, it rests or is supported on the side rails 82 and 84. These side rails are interconnected by cross members, such as 86 and 88, which support and carry the guide members 77 and 79. Adjacent the discharge end of the delivery conveyor there is provided a pair of swingable-alignment members 90 and 92 which are mounted to an outrigger-type support 94 by a torsion-bar-type arrangement such as 96 or 98. The bars act to engage the sides of each tire or coil as it moves toward the shears so as to center the tire or coil on the conveyor.

The frame 74 terminates at cross member 114 at a position between the discharge end of the conveyor chain and the outrigger-type support 94. A housing is provided between the support 94 and the cross member 114 within which the conveyor drive means are mounted. The guide members 77 and 79 and the conveyor chain 76 extend from the cross member 114 and are supported in a cantilever fashion therefrom.

The conveyor is arranged so that the cross member 94 can be positioned adjacent the stationary jaws of the shears and the discharge end positioned therebetween. When a tire or coil is positioned at the discharge end of the conveyor most of the weight of the tire or coil is carried by the stationary jaws.

Power to drive the conveyor is provided by an electric motor 100 which is mounted to the frame and is connected to the generator 34 for power. The output of the motor 100 is transferred from the clutch-brake 115 by a belt and pulley system 102, generally, to a speed reducer 104 which drives the top end roller 105 which in turn drives the conveyor chain. The conveyor chain is guided between the guide members and is trained about the top end roller 105, the bottom end roller 106, and idlers 110 and 112.

Trip-lever type limit switches (not shown) are provided in association with the conveyor and the shears so as to stop the conveyor, activate the shears, and chop the tire when it is positioned approximately midway over the stationary jaws 54 and 56. The limit switch is positioned on the underside of the conveyor so as to be activated by a leading flight member (such as 81) when the trailing flight (such as 80) carrying the tire or coil is positioned between the shear jaws. The timing of the conveyor's movement with respect to the chopping action of the shears can be adjusted with the limit switch so as to assure proper shearing and to avoid jamming of the conveyor.

The discharge conveyor 26 is of a design suitable to receive the chopped tire or coil segments thereon and move them to a storage site or secondary treatment station near the cutting apparatus.

In operation, the truck is driven to an area where a large number of scrap tires or coils are located, such as a land fill site, and the conveyors are removed from the truck and mounted in the positions as shown. The truck engine may be shut off and the motor-generator set started up. Power from the motor-generator set is provided to the shear motors 40 and 42 as well as the conveyor motor 100 and the drive means for the discharge conveyor 26. Then the conveyor 22 is activated and the tires or coils are loaded on the conveyor by positioning them over the pick-up posts or flights which transport them along the conveyor to a position between the stationary and movable jaws of each of the shears.

When the tire or coil is approximately centered in the shears the limit switch stops the conveyor and activates flow of hydraulic fluid to the cylinders 46 and 48 which then move to their extended position, thereby forcing the movable jaws downwardly so as to shear the tire or coil in half. At the end of the downward stroke after the shearing has taken place the cylinders are retracted by means of their double-acting feature so as to open the jaws and the conveyor restarts. After the shearing has taken place the leading half of the tire or coil falls onto the discharge conveyor 26. The trailing half of the tire or coil is moved by the chain off the end of the conveyor after the shear jaws have moved to their open position.

After all of the tires or coils available at that site have been sheared into segments, the diesel engine 30 is closed down and the conveyors 22 and 26 are mounted to the truck for transporting to another site.

The segments can be cryogenically treated by exposing them to cryogenic temperatures for a length of time sufficient to embrittle them and then striking the embrittled segment with a force sufficient to cause it to shatter. The segments can be lowered to the embrittling temperature by exposing or submerging them in a bath of liquid nitrogen. When a tire segment is removed from the bath substantially all of the cryogen within the segment drains back into the bath.

It will be appreciated that numerous changes and modifications can be made to the embodiment disclosed herein without departing from the spirit and scope of this invention.

What is claimed and desired to be secured by Letters Patent of the United States is:

1. A mobile material-chopping apparatus, for chopping substantially ring-shaped bodies into segments, which includes: an elongated movable bed; shear means which include movable cutting jaws for chopping the body delivered thereto into segments; delivery conveyor means cooperatively arranged with respect to said bed and said shear means for moving the bodies from a loading position to said shear means; and means for actuating said shear means so as to chop said body, wherein said shear means include cutting means which move in a substantially vertical plane which is parallel to the longitudinal axis of said bed; and wherein said cutting means include two aligned shears each including a stationary lower jaw and a movable upper jaw pivotally mounted for shearing cooperation with said lower jaw, and the shears being spaced from each other by a distance sufficient to permit at least a portion of said delivery conveyor to fit therebetween, so as to deliver said ring-shaped body to a chopping position between the upper and lower jaws of each shear for chopping into segments.

2. A material-chopping apparatus as in claim 1 wherein, in the conveying position, the delivery conveyor moves said bodies across the bed in a lateral direction transverse to the longitudinal axis of the bed.

* * * * *